United States Patent
Lash et al.

(10) Patent No.: US 12,223,514 B2
(45) Date of Patent: Feb. 11, 2025

(54) METHOD FOR VALIDATING A PRODUCT PORTFOLIO

(71) Applicant: Dell Products L.P., Round Rock, TX (US)

(72) Inventors: Steven J. Lash, Leander, TX (US); Chiang-Ting Sung, Taoyuan (TW)

(73) Assignee: Dell Products L.P., Round Rock, TX (US)

( * ) Notice: Subject to any disclaimer, the term of this patent is extended or adjusted under 35 U.S.C. 154(b) by 314 days.

(21) Appl. No.: 17/578,994

(22) Filed: Jan. 19, 2022

(65) Prior Publication Data

US 2023/0230101 A1 Jul. 20, 2023

(51) Int. Cl.
*G06Q 30/018* (2023.01)
*G06Q 50/04* (2012.01)

(52) U.S. Cl.
CPC .......... *G06Q 30/018* (2013.01); *G06Q 50/04* (2013.01)

(58) Field of Classification Search
None
See application file for complete search history.

(56) References Cited

U.S. PATENT DOCUMENTS 9,924,366 B2 * 3/2018 Schmidt ............... H04L 63/123
11,005,845 B2 5/2021 Fox et al.

* cited by examiner

*Primary Examiner* — Jan P Mincarelli
(74) *Attorney, Agent, or Firm* — Larson Newman, LLP

(57) ABSTRACT

An information handling system includes a processor and a memory. The processor receives a set of validation items to be validated for each of a plurality of platforms of a portfolio of platforms. The processor further determines that a first set of validation items for a first platform includes a first validation item and that a second set of validation items for a second platform includes a second validation item. The processor compares the first validation item with the second validation item to determine if the first and second validation items are duplicate validation items. When the first and second validations are duplicate validation items, the processor maintains the first set of validation items to include the first validation item, and modifies the second set of validation items to exclude the second validation item.

20 Claims, 7 Drawing Sheets

110
Platform A

| | OS | | | |
|---|---|---|---|---|
| | Win1 | Win2 | Linux | VMWare |
| HBA1 | 1 | 0 | 1 | 1 |
| HBA2 | 1 | 0 | 0 | 0 |
| HBA3 | 1 | 0 | 0 | 0 |

| | Driver | | | |
|---|---|---|---|---|
| | Win1 | Win2 | Linux | VMWare |
| HBA1 | 1 | 0 | 1 | 1 |
| HBA2 | 1 | 0 | 0 | 0 |
| HBA3 | 1 | 0 | 0 | 0 |

| | BIOS | | | |
|---|---|---|---|---|
| | Win1 | Win2 | Linux | VMWare |
| HBA1 | 1 | 0 | 1 | 1 |
| HBA2 | 1 | 0 | 0 | 0 |
| HBA3 | 1 | 0 | 0 | 0 |

Validation Effort = 15 Items

120
Platform B

| | OS | | | |
|---|---|---|---|---|
| | Win1 | Win2 | Linux | VMWare |
| HBA1 | 1 | 0 | 1 | 1 |
| HBA2 | 1 | 0 | 1 | 0 |
| HBA3 | 1 | 0 | 0 | 0 |

| | Driver | | | |
|---|---|---|---|---|
| | Win1 | Win2 | Linux | VMWare |
| HBA1 | 1 | 0 | 1 | 1 |
| HBA2 | 1 | 0 | 1 | 0 |
| HBA3 | 1 | 0 | 0 | 0 |

| | BIOS | | | |
|---|---|---|---|---|
| | Win1 | Win2 | Linux | VMWare |
| HBA1 | 1 | 0 | 1 | 1 |
| HBA2 | 1 | 0 | 1 | 0 |
| HBA3 | 1 | 0 | 0 | 0 |

Validation Effort = 18 Items

130
Platform C

| | OS | | | |
|---|---|---|---|---|
| | Win1 | Win2 | Linux | VMWare |
| HBA1 | 1 | 1 | 1 | 1 |
| HBA2 | 1 | 1 | 1 | 1 |
| HBA3 | 1 | 1 | 0 | 0 |

| | Driver | | | |
|---|---|---|---|---|
| | Win1 | Win2 | Linux | VMWare |
| HBA1 | 1 | 1 | 1 | 1 |
| HBA2 | 1 | 1 | 1 | 1 |
| HBA3 | 1 | 1 | 0 | 0 |

| | BIOS | | | |
|---|---|---|---|---|
| | Win1 | Win2 | Linux | VMWare |
| HBA1 | 1 | 1 | 1 | 1 |
| HBA2 | 1 | 1 | 1 | 1 |
| HBA3 | 1 | 1 | 0 | 0 |

Validation Effort = 30 Items
Total Validation Effort = 63 Items

110
Platform A

| HBA | OS |  |  |  |
|---|---|---|---|---|
|  | Win | Win2 | Linux | VMWare |
| HBA1 | 1 | 0 | 1 | 1 |
| HBA2 | 1 | 0 | 0 | 0 |
| HBA3 | 1 | 0 | 0 | 0 |

| HBA | Driver |  |  |  |
|---|---|---|---|---|
|  | Win | Win2 | Linux | VMWare |
| HBA1 | 1 | 0 | 1 | 1 |
| HBA2 | 1 | 0 | 0 | 0 |
| HBA3 | 1 | 0 | 0 | 0 |

| HBA | BIOS |  |  |  |
|---|---|---|---|---|
|  | Win1 | Win2 | Linux | VMWare |
| HBA1 | 1 | 0 | 1 | 1 |
| HBA2 | 1 | 0 | 0 | 0 |
| HBA3 | 1 | 0 | 0 | 0 |

Validation Effort = 15 Items

120
Platform B

| HBA | OS |  |  |  |
|---|---|---|---|---|
|  | Win | Win2 | Linux | VMWare |
| HBA1 | \ | 0 | \ | \ |
| HBA2 | \ | 0 | 1 | 0 |
| HBA3 | \ | 0 | 0 | 0 |

| HBA | Driver |  |  |  |
|---|---|---|---|---|
|  | Win | Win2 | Linux | VMWare |
| HBA1 | \ | 0 | \ | \ |
| HBA2 | \ | 0 | 1 | 0 |
| HBA3 | \ | 0 | 0 | 0 |

| HBA | BIOS |  |  |  |
|---|---|---|---|---|
|  | Win1 | Win2 | Linux | VMWare |
| HBA1 | \ | 0 | \ | \ |
| HBA2 | \ | 0 | 1 | 0 |
| HBA3 | \ | 0 | 0 | 0 |

Validation Effort = 3 Items

130
Platform C

| HBA | OS |  |  |  |
|---|---|---|---|---|
|  | Win | Win2 | Linux | VMWare |
| HBA1 | \ | 1 | \ | \ |
| HBA2 | \ | 1 | \ | 1 |
| HBA3 | \ | 1 | 0 | 0 |

| HBA | Driver |  |  |  |
|---|---|---|---|---|
|  | Win | Win2 | Linux | VMWare |
| HBA1 | \ | 1 | \ | \ |
| HBA2 | \ | 1 | \ | 1 |
| HBA3 | \ | 1 | 0 | 0 |

| HBA | BIOS |  |  |  |
|---|---|---|---|---|
|  | Win1 | Win2 | Linux | VMWare |
| HBA1 | \ | 1 | \ | \ |
| HBA2 | \ | 1 | \ | 1 |
| HBA3 | \ | 1 | 0 | 0 |

Validation Effort = 12 Items
Total Validation Effort = 30 Items

110
Platform A

| HBA | OS |  |  |  | | HBA | Driver |  |  |  | | HBA | BIOS |  |  |  |
|---|---|---|---|---|---|---|---|---|---|---|---|---|---|---|---|---|
|  | Win | Win2 | Linux | VMWare | |  | Win | Win2 | Linux | VMWare | |  | Win1 | Win2 | Linux | VMWare |
| HBA1 | 1 | 0 | 1 | 1 | | HBA1 | 1 | 0 | 1 | 1 | | HBA1 | 1 | 0 | 1 | 1 |
| HBA2 | \ | 0 | 0 | 0 | | HBA2 | \ | 0 | 0 | 0 | | HBA2 | \ | 0 | 0 | 0 |
| HBA3 | \ | 0 | 0 | 0 | | HBA3 | \ | 0 | 0 | 0 | | HBA3 | \ | 0 | 0 | 0 |

Validation Effort = 9 Items

120
Platform B

| HBA | OS |  |  |  | | HBA | Driver |  |  |  | | HBA | BIOS |  |  |  |
|---|---|---|---|---|---|---|---|---|---|---|---|---|---|---|---|---|
|  | Win | Win2 | Linux | VMWare | |  | Win | Win2 | Linux | VMWare | |  | Win1 | Win2 | Linux | VMWare |
| HBA1 | \ | 0 | \ | \ | | HBA1 | \ | 0 | \ | \ | | HBA1 | \ | 0 | \ | \ |
| HBA2 | 1 | 0 | 1 | 0 | | HBA2 | 1 | 0 | 1 | 0 | | HBA2 | 1 | 0 | 1 | 0 |
| HBA3 | 1 | 0 | 0 | 0 | | HBA3 | 1 | 0 | 0 | 0 | | HBA3 | 1 | 0 | 0 | 0 |

Validation Effort = 9 Items

130
Platform C

| HBA | OS |  |  |  | | HBA | Driver |  |  |  | | HBA | BIOS |  |  |  |
|---|---|---|---|---|---|---|---|---|---|---|---|---|---|---|---|---|
|  | Win | Win2 | Linux | VMWare | |  | Win | Win2 | Linux | VMWare | |  | Win1 | Win2 | Linux | VMWare |
| HBA1 | \ | 1 | \ | \ | | HBA1 | \ | 1 | \ | \ | | HBA1 | \ | 1 | \ | \ |
| HBA2 | \ | 1 | \ | 1 | | HBA2 | \ | 1 | \ | 1 | | HBA2 | \ | 1 | \ | 1 |
| HBA3 | \ | 1 | 0 | 0 | | HBA3 | \ | 1 | 0 | 0 | | HBA3 | \ | 1 | 0 | 0 |

Validation Effort = 12 Items
Total Validation Effort = 30 Items

Platform A | Platform B | Platform C

Required Validation

| | OS | | | | Driver | | | | BIOS | | | |
|---|---|---|---|---|---|---|---|---|---|---|---|---|
| | Win | Win2 | Linux | VMWare | Win | Win2 | Linux | VMWare | Win1 | Win2 | Linux | VMWare |
| HBA1 | 1 | 0 | 1 | 1 | 1 | 0 | 1 | 1 | 1 | 0 | 1 | 1 |
| HBA2 | 1 | 0 | 0 | 0 | 1 | 0 | 0 | 0 | 1 | 0 | 0 | 0 |
| HBA3 | 1 | 0 | 0 | 0 | 1 | 0 | 0 | 0 | 1 | 0 | 0 | 0 |

Validation Plan

| | OS | | | | Driver | | | | BIOS | | | |
|---|---|---|---|---|---|---|---|---|---|---|---|---|
| | Win | Win2 | Linux | VMWare | Win | Win2 | Linux | VMWare | Win1 | Win2 | Linux | VMWare |
| HBA1 | 1 |  | 1 | 1 | 1 |  | 1 | 1 | 1 |  | 1 | 1 |
| HBA2 | 1 |  |  |  | 1 |  |  |  | 1 |  |  |  |
| HBA3 | 1 |  |  |  | 1 |  |  |  | 1 |  |  |  |

Completed Validation

| | OS | | | | Driver | | | | BIOS | | | |
|---|---|---|---|---|---|---|---|---|---|---|---|---|
| | Win | Win2 | Linux | VMWare | Win | Win2 | Linux | VMWare | Win1 | Win2 | Linux | VMWare |
| HBA1 | 1 |  | 1 | 1 | 1 |  | 1 | 1 | 1 |  | 1 | 1 |
| HBA2 | 1 |  |  |  | 1 |  |  |  | 1 |  |  |  |
| HBA3 | 1 |  |  |  | 1 |  |  |  | 1 |  |  |  |

*FIG. 6*

METHOD FOR VALIDATING A PRODUCT PORTFOLIO

FIELD OF THE DISCLOSURE

This disclosure generally relates to manufacturing information handling systems, and more particularly relates to providing a method for validating a product portfolio rather than validating individual platforms within the product portfolio.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, reservations, enterprise data storage, or global communications. In addition, information handling systems may include a variety of hardware and software resources that may be configured to process, store, and communicate information and may include one or more computer systems, data storage systems, and networking systems.

SUMMARY

An information handling system may include a processor and a memory. The processor may receive a set of validation items to be validated for each of a plurality of platforms of a portfolio of platforms. The processor may further determine that a first set of validation items for a first platform includes a first validation item and that a second set of validation items for a second platform includes a second validation item. The processor may compare the first validation item with the second validation item to determine if the first and second validation items are duplicate validation items. When the first and second validations are duplicate validation items, the processor may maintain the first set of validation items to include the first validation item, and may modify the second set of validation items to exclude the second validation item.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which:

FIG. 2 illustrates a validation plan of record (POR) for the platforms of the portfolio of FIG. 1, FIGS. 3 and 4 illustrate optimized validation PORs for the platforms of the portfolio of FIG. 1 according to an embodiment of the current disclosure;

FIG. 6 illustrates a portfolio validation management system according to an embodiment of the current disclosure.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings, and should not be interpreted as a limitation on the scope or applicability of the teachings. However, other teachings can certainly be used in this application. The teachings can also be used in other applications, and with several different types of architectures, such as distributed computing architectures, client/server architectures, or middleware server architectures and associated resources.

Figure 1:
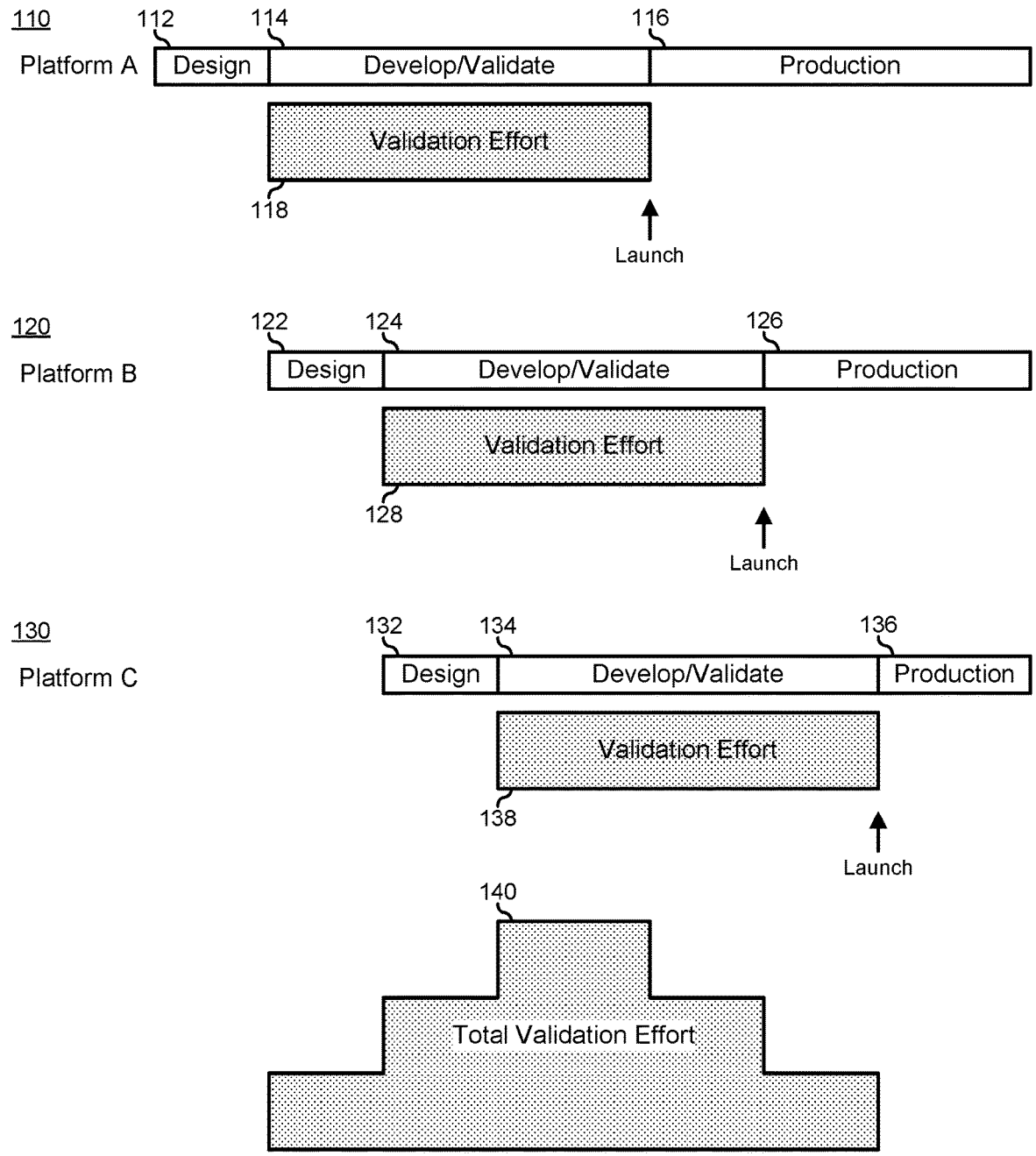
FIG. 1 is illustrates a development cycle for a portfolio of platforms according to an embodiment of the current disclosure.

FIG. 1 illustrates a development cycle 100 for a portfolio of platforms, including platform A 110, platform B 120, and platform C 130. Platform A 110 is illustrated is including a design stage 112, a development/validation stage 114, and a sustaining production stage 116. A validation effort 118 is illustrated as beginning at the end of design stage 112, and ending at the beginning of production stage 116. Platform B 120 is illustrated is including a design stage 122, a development/validation stage 124, and a sustaining production stage 126. A validation effort 128 is illustrated as beginning at the end of design stage 122, and ending at the beginning of production stage 126. Platform C 130 is illustrated is including a design stage 132, a development/validation stage 134, and a sustaining production stage 136. A validation effort 138 is illustrated as beginning at the end of design stage 132, and ending at the beginning of production stage 136.

Platforms 110, 120, and 130 will be understood to be related based upon a particular element or set of elements of the respective platforms that are provided in common within all of the platforms of the portfolio. For example, platforms 110, 120, and 130 may share a common hardware element, such as a processor or processor family, a common processor/chipset combination, a common System-on-a-Chip (SoC) device, a common memory family (e.g., DDR4, DDR5, etc.), or the like, or may share a common software or firmware element, such as a common BIOS/UEFI, a common operating system, or the like. In a particular embodiment, platforms 110, 120, and 130 represent related information handling system types that are all based upon a common hardware element or set of elements, such as may be derived from a processor manufacturer's processor/chipset family reference design. As such, the various platforms 110, 120, and 130 may each be based upon said processor manufacturer's platform roadmap, where each platform represents an incremental expansion of the capabilities of the associated processor or chipset. However, it should be understood that, in other embodiments, platforms 110, 120, and 130 may represent related information handling types that are all based upon a common code-based element or set of elements, such as may be derived form an operating system provider's roadmap.

Design stages 112, 122, and 132 represent the processes and procedures for selecting the hardware and code-based elements of respective platforms 110, 120, and 130, and integrating the selected elements into a manufacturable platform. Design stages 112, 122, and 132 may include the establishment of a plan of record (POR) for associated platforms 110, 120, and 130. A POR may define a variety of different elements that may be implemented or instantiated on the associated platform, and, by virtue of being excluded from the POR, other elements that are not supported for implementation or instantiation on the associated platform.

Development/validation stages 114, 124, and 134 represent the processes and procedures to receive the elements of associated platforms 110, 120, and 130, and to assemble the elements into the completed platforms. This assembly process may typically be understood to represent the fabrication of prototype platforms, and limited quantities of the completed platforms for use in validating the associated platforms. As such, validation efforts 118, 128, and 138 may be understood to represent the processes and procedures performed by a platform validation team to ensure that the design meets all of the specified requirements, that the design is robust to ensure that the platforms can meet the warranty requirements, that all of the elements of the platforms operate together as planned without any incompatibilities, and to work out any problems that are identified. While a launch date is typically predetermined, the associated validation efforts 118, 128, and 138 may yet be understood to gate the launch of the platforms, as needed or desired.

Validation effort 118, 128, and 138 may typically comprise three validation stages, including component validation, platform validation, and solution validation. Component validation may include various qualification activities for the components that make up a particular platform, as well as unit testing, as needed or desired. Platform validation may include various qualification activities for each component as integrated into the platform, and may include platform-level unit testing. Solution validation may include qualification activities for several platforms that are designed to operate together to create a broader solution, such as a datacenter computing solution, a virtual desktop computing solution, or the like. Typically, the validation effort for each platform represents a significant cost adder for the development process of the platforms. Such costs may include purchase costs for the components integrated into the platform, labor costs for developing and performing the validation activities, and the time needed to perform the validation activities.

Production stages 116, 126, and 136 represent the time after the launch of the associated platforms when the platforms are marketed and sold to the customers as needed or desired. It will be understood that further validation efforts, and issue resolution with the sold platforms may yet be performed during production stages 116, 126, and 136, as needed or desired. However, for the purposes of simplifying the present illustrations, validation efforts 118, 128 and 138 will be understood to be completed when associated platforms 110, 120, and 130 are launched and associated production stages 116, 126, and 136 are commenced. In a typical portfolio, the design of subsequent platforms within the portfolio are started later in time than the design stage for the initial platform. However, it will be understood that an actual development cycle may include multiple platforms being designed simultaneously, as needed or desired.

Note that validation efforts 118, 128, and 138 are overlapping in time, such that validation effort 128 commences while validation effort 118 is still ongoing, and similarly validation effort 138 commences while both validation efforts 118 and 120 are still ongoing. As such, a total validation effort 140 is shown. It will be understood that platforms 110, 120, and 130 may be provided by a common manufacturer, such as an Original Equipment Manufacturer (OEM) or the like, may be provided by one or more Original Development Manufacturer (ODM), or by a combination of platforms provided by the OEM and the one or more ODM, as needed or desired. Note further that, as illustrated, validation efforts 118, 128, and 138 each represent a common level of validation effort, as indicated by the height of the illustrated blocks, and a common duration of validation effort, as indicated by the width of the illustrated blocks, but this is not necessarily so, and the level and duration of the validation effort may differ from one platform to another, as needed or desired.

FIG. 2 illustrates a POR 200 for platforms 110, 120, and 130. Here, each platform is expected to operate with any one of three Host Bus Adapters (HBAs 1-3). Further, the portfolio, that is, at least one platform, is expected to operate with one or more of four OS (two versions of Windows OS (Win 1 and Win 2), a Linux OS, and a VMWare OS), and each OS has an associated HBA driver for each HBA, and an associated BIOS. Here, the combination of HBAs, OS, Drivers, and BIOS make up a 12×3 matrix of interoperability for each particular platform. HBA 1 may be understood to represent a legacy HBA that is well known and with which each platform will be expected to operate. HBA 2 may be understood to represent a new HBA, such as an upgrade for HBA 1, or another newer HBA, with which each platform will also be expected to operate. HBA 3 may be understood to represent a future HBA that is expected to operate with each platform. The Win 1 OS, the Linux OS, and the VMWare OS may be understood to represent current OS versions, while Win 2 OS may be understood to represent an upcoming major revision of the Windows OS.

Here, Platform A 110 is shown as being expected to operate with each HBA in the Win 1 OS, as not being expected to operate with the Win 2 OS with any HBA, and is only expected to operate with HBA 1 in the Win 1 OS, the Linux OS, and the VMWare OS. Here, the Win 2 OS may be understood to not arrive until the platform 130 timeframe. Likewise, driver and BIOS support for HBAs 2 and 3 may not be expected to be available for the Linux OS and the VMWare OS in time for platform A 110. Platform B 120 is shown as being expected to incorporate all of the interoperability of platform A 110, and to add support for HBA 2 under the Linux OS, the Linux driver, and the Linux BIOS. Finally, Platform C 130 is shown as being expected to incorporate all of the interoperability of platform B 120, to fully support the Win 2 OS and associated drivers and BIOS for all three HBAs, and to add VMWare OS, VMWare driver, and VMWare BIOS support for HBA 2. It will be understood that any particular platform may include more than three HBAs with which it is expected to operate, and that other types of devices, OS, drivers, and BIOS may be included in a POR, as needed or desired.

In a typical validation effort for a particular platform, each item on that platform's POR will be expected to be validated. As such, for platform A 110, 15 POR items are included, and hence the validation effort to be performed by the platform A validation team will encompass all 15 items that need to be tested and verified. Similarly, for platform B 120, 18 POR items are included, and hence the validation effort to be performed by the platform B validation team will encompass all 18 items that need to be tested and verified. Finally, for platform C 130, 30 POR items are included, and hence the validation effort to be performed by the platform C validation team will encompass all 30 items that need to be tested and verified. Here, the total validation effort will be given as:

Total Val=Platform *A* Val+Platform *B* Val+Platform *C* Val.

Here, assuming each POR item represents an equal amount of validation effort, the portfolio will require a total of 15+18+30=63 validation items, and each successive platform will require greater validation effort than the preview platforms because the backward compatibility with previous platforms.

Note that, where platforms 110, 120, and 130 are being designed, developed, and produced by different manufacturers, such as where one or more platform is provided by an OEM, and one or more platform is provided by an ODM, the manufacturer of each platform will typically be responsible for the validation of every POR feature of their platform, without knowledge or support from the validation teams of the other platforms. Several factors may contribute to the siloed platform validation efforts, including the fact that such validation activities are typically very complex, to the point that each validation effort is managed by a separate team that may not have access to the plans or results of the other teams. Moreover, where different manufacturers are providing the different platforms, the lack of Non-Disclosure Agreements (NDAs) between the manufacturers may further hamper cross-communication and limit the visibility of the validation teams into the effort of the other teams to leverage their results.

It has been understood by the inventors of the present disclosure that much of the validation effort of the typical platform development cycle represents redundant effort. That is, various components are validated multiple times by the different platform validation teams. This redundant effort increases the cost and duration of the individual validation efforts. As such, in a particular embodiment, a portfolio validation management system is provided that unifies the validation effort between the validation teams, such that each validation team can leverage the efforts of the other validation teams to reduce redundant validation items, thereby lowering the cost and duration of the validation of the entire portfolio. Here, it may be assumed that, where one validation team validates a particular component or subsystem under a given set of conditions, such as where a particular device has been validated to operate with a particular OS, driver, and BIOS, that that particular device will likewise operate under the same set of conditions on other platforms.

As such, a portfolio validation management system operates to receive the individual platform PORs, and to integrate the PORs into an overall portfolio POR. The portfolio POR represents the union of all of the components and operating conditions for each of the components in the individual PORs into a single set of validation items that need to be validated for the portfolio. The portfolio validation management system further operates to allocate the validation items to the various platform validation teams to ensure that all of the validation items are covered, and to eliminate redundant validation efforts. In a first case, as shown in FIG. 3 and described further below, the portfolio validation management system directs that the lead platform in any particular portfolio has all of the validation items validated by that platform's validation team, and then directs that each subsequent platform in the portfolio has only the additional validation items validated by the subsequent platform's validation teams. In a second case, as shown in FIG. 4 and described further below, the portfolio management system operates to optimize the validation effort by the various platform validation teams to balance the workload between the teams, to reduce the overall cost of validation, or to otherwise optimize the performance of the total validation effort. For example, validation items needed to be validated in the lead platform may be validated by one of the subsequent platform validation teams, as needed or required to lessen the amount of validation performed on the lead platform, to reduce the cost of the validation of the lead platform, or the like.

In either case, a particular platform validation team gains confidence in the use and interoperability of items which have not individually been validated by that team by virtue of those items being validated by other platform validation teams. Moreover, by leveraging the efforts of other platform validation teams, each platform team gains the confidence to extend its own POR to include items validated by other platform validation teams. For example, consider where the platform C 130 team extends its POR to include a recently developed HBA, e.g., HBA 4. In this case, the platform C 130 platform validation team may decide to extend its POR to include HBA 4. Then, advantageously, the platform A 110 and platform B 120 teams may opt to extend their PORs without having to explicitly validate HBA 4 by leveraging the validation performed by the platform C 130 validation team's effort.

FIG. 3 illustrates a validation plan 300 for validating platforms 110, 120, and 130. Here, validation plan 300 utilizes a validation management system as illustrated in FIG. 6 and described further below, where the portfolio validation management system directs that platform A 110 has all of the validation items validated by that platform's validation team. Thus, HBAs 1-3 are all validated on the Win 1 OS, and HBA 1 is further validated on the Linux OS and the VMWare OS. Then the portfolio validation management system directs that platform B leverages the validation performed by the platform A 110 validation team, and only validates HBA 2 on the Linux OS. Finally, the portfolio validation manager directs that platform C 130 leverages the validation performed by the platform A 110 and platform B 120 validation teams, and validates all of HBAs 1-3 on the Win 2 OS, and further validates HBA 2 on the VMWare OS.

In this case, each item each of platforms 110, 120, and 130 PORs will be expected to be validated, either locally, or as a leverage of the validation effort of the other platforms. As such, for platform A 110, 15 POR items are included, and, being the lead platform of the portfolio, the validation effort to be performed by the platform A validation team will encompass all 15 items that need to be tested and verified. Then, for platform B 120, 18 POR items are included, but the 15 POR items that are in common with platform A 110 leverage the platform A validation effort, and only 3 items will be tested and verified on platform B. Finally, for platform C 130, 30 POR items are included, but the 18 items that are in common with platform A 110 and platform B 120 leverage the platform A and platform B validation efforts, and only 12 items will be tested and verified on platform C. Here, the total validation effort will be given as:

Total Val=Platform *A* Val+Incremental Platform *B*
Val+Incremental Platform *C* Val, and the portfolio will only require a total of 15+3+12=30 validation items. Here, it will be understood that not only is the validation effort reduced, but also, the need for each platform to maintain hardware items for all of the validation elements may also be reduced, thereby decreasing the overall cost of the total validation effort.

FIG. 4 illustrates a validation plan 400 for validating platforms 110, 120, and 130, and that utilizes the validation management system of FIG. 6. Here, the portfolio validation management system operates to optimize the validation effort by the various platform validation teams to balance the workload between the teams, to reduce the overall cost of validation, or to otherwise optimize the performance of the total validation effort. In particular, the portfolio validation management system operates to unload some of the front-loaded validation of platform A 110, deferring several validation items to be performed by the validation team of platform B 120. As such, the portfolio validation management system directs that platform A 110 only validates the validation items related to HBA 1, deferring the Win 1 OS validation of HBAs 2 and 3 to be performed by the platform B 120 validation team. Then the portfolio validation management system directs that platform B leverages the validation performed by the platform A 110 validation team, adding the validation of HBAs 2 and 3 on the Win 1 OS and the validation of the HBA 2 on the Linux OS. Finally, the portfolio validation manager directs that platform C 130 leverages the validation performed by the platform A 110 and platform B 120 validation teams, and validates all of HBAs 1-3 on the Win 2 OS, and further validates HBA 2 on the VMWare OS.

Again, each item each of platforms 110, 120, and 130 PORs will be expected to be validated, either locally, or as a leverage of the validation effort of the other platforms. As such, for platform A 110, 15 POR items are included, but only 9 POR items are validated by the platform A validation team. Then, for platform B 120, 18 POR items are included, but the 9 POR items that were validated in the platform A 110 validation are leveraged, leaving 9 items to be tested and verified on platform B. Finally, for platform C 130, 30 POR items are included, but the 18 items that are in common with platform A 110 and platform B 120 leverage the platform A and platform B validation efforts, and only 12 items will be tested and verified on platform C. Here, the total validation for the portfolio will again require a total of 9+9+12=30 validation items, but some of the platform A 110 validation effort is deferred to the platform B 120 validation effort. Here further, the portfolio validation management system may not only defer the validation of HBAs 2 and 3 from the platform A 110 validation effort to the platform B 120 validation effort in order to balance the validation efforts between platform A and platform B, but the portfolio validation management system may also defer the validation in order to take advantage of the expected lower cost of HBAs 2 and 3 at the later time of the platform B validation effort.

Figure 5:
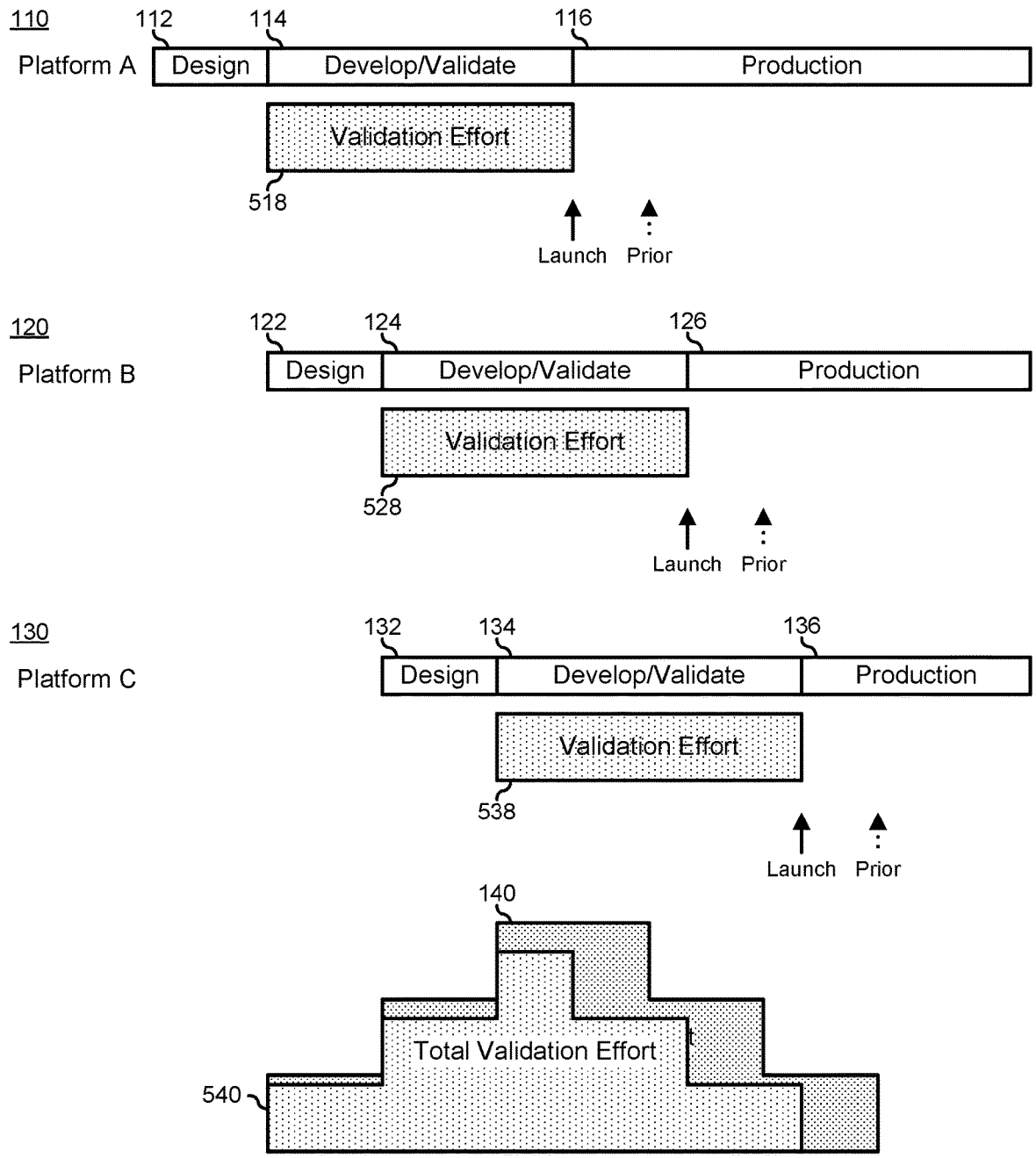
FIG. 5 is illustrates a development cycle for a portfolio of platforms according to another embodiment of the current disclosure.

FIG. 5 illustrates a modified development cycle 500 for the portfolio of platforms, including platform A 110, platform B 120, and platform C 130. Here, because the associated validation effort 518 for platform A 110, validation effort 528 for platform B 120, and validation effort 538 for platform C 130 are all shortened, as compared with the typical validation efforts as shown in FIG. 1, the launch of each platform may be pulled in as compared with the prior launch dates as illustrated. Further the total validation effort 540 will be seen to be less than the typical total validation effort 140.

FIG. 6 illustrates a portfolio validation management system 600. Portfolio validation management system 600 represents an information handling system configure to perform the functions and features as described herein. As such, portfolio validation management system 600 will be understood to include various hardware, such as processors, memory, I/O devices, and the like, as may typically be found in an information handling system, such as the information handling system shown in FIG. 7 and described further below. Portfolio validation management system 600 will further be understood to include code-based elements instantiated on the portfolio validation management system that provide an operating environment for performing the functions and features as described herein, such as a BIOS, an OS, firmware elements, and the like. Further, portfolio validation management system 600 will be understood to include other code-based elements instantiated within the operating environment that provide the functions and features as described herein, such as a database/spreadsheet program, a validation analysis program, a teaming communication program, or the like.

Portfolio validation management system 600 operates to unify the validation effort between the validation teams of the various platforms in a portfolio, such that each validation team can leverage the efforts of the other validation teams to reduce redundant validation items, thereby lowering the cost and duration of the validation of the entire portfolio. As such, portfolio validation management system 600 operates to receive the individual platform PORs, and to integrate the PORs into an overall portfolio POR.

Each individual platform POR is represented by a database/spreadsheet tab, here depicted as a separate tab for each of platform A 110, platform B 120, and platform C 130. In gathering the individual platform PORs, portfolio validation management system 600 operates to provide a secure communication channel for each platform validation team to upload, manage, maintain, and modify their POR. Thus each platform tab will include a depiction of the POR in a Required Validation field that can be modified as needed to keep portfolio validation management system updated with the latest POR information from each platform validation team. The Required Validation field may include options menus for adding or deleting items, such as additional HBAs or other elements, additional OS, drivers, or BIOS, or the like, and for providing an indication as to which combinations of elements are to be validated.

Each platform tab will further include a depiction of the validation expected to be performed by that platform's validation team in a Validation Plan field. Here, the items that are not included on the POR are blacked out, the items that are to be validated but not by the particular platform's validation team are darkened, and the items that are to be validated by the particular platform's validation team are brightened. Finally, each platform tab will include a depiction of the validation that is completed in a Completed Validation field. Here, the items identified as to be validated by the particular validation team are depicted as either darkened, indicating that the validation item has been completed, or as brightened, indicating that the validation item has yet to be completed. Here, a third state, such as a yellow color, may indicate that the validation item is in process of being completed. Further, a fourth state, such as a red color, may be utilized to indicate that the validation item has experienced an issue that is being debugged or otherwise addressed. In this way, the overall validation status for each platform can be quickly ascertained.

In a particular embodiment, portfolio validation management system 600 incorporates time-dependent aspects of the PORs for the platforms within the portfolio. Here, in a particular embodiment, a yet to be completed validation item can be provided with a first indication to show that the validation item is not yet scheduled to be completed, or with a second indication to show that the validation item is scheduled to be completed but is not yet completed. For example, a brightened validation item with no other distinguishing feature may indicate that the validation item is on schedule, while a brightened validation item with an asterisk or an exclamation point may indicate that the validation item is behind schedule. In another embodiment, each validation item may include a clickable link that displays the current status of the validation item, including whether the validation item is completed, a completion date, a description of the completion status with reference to the schedule, or the like.

In a particular embodiment, portfolio validation management system 600 includes another tab that provides an overall portfolio view similar to the individual platform tabs that provides an overview of the validation effort. Here, the Required Validation field will include the union of all of the individual platform validation PORs. The Validation Plan field will include all validation items. Any validation items that are not POR for any platform will be blacked out. In this way, an overview of what is not scheduled to be validated can be quickly identified, and a decision can be made as to whether or not such a validation item should be included in the overall POR. Here further, items that to be validated and are covered by at least one of the platform validation plans can be shown as brightened items, and items that are not covered by any platform validation plan can be shown as darkened, thereby easily identifying gaps in the overall validation plan. In a particular embodiment, portfolio validation management system 600 operates to provide a suggested validation team to validate any items that are not covered, based upon various optimization schemes, such as workload balancing between the validation teams, performance to schedule of the validation teams, cost balancing between the validation teams, or the like. The Completed Validation field will include the union of all of the Completed Validation fields from the individual platforms, permitting a convenient view of the overall completion status for the portfolio, and the rapid identification of issues or validation items that are behind schedule and that are at risk for delaying the launch of the platforms.

In a particular embodiment, portfolio validation management system 600 operates to evaluate the various platform PORs based upon a multi-dimensional matrix to identify and eliminate duplication of validation efforts across the various platforms of the portfolio. Here, portfolio validation management system 600 may utilize various analysis algorithms, such as Boolean Algebra, Karnaugh maps, and the like. In another embodiment, portfolio validation management system 600 utilizes various artificial intelligence (AI) and machine learning (ML) algorithms to optimize the validation plans for the platforms of the portfolio, as needed or desired.

Figure 7:
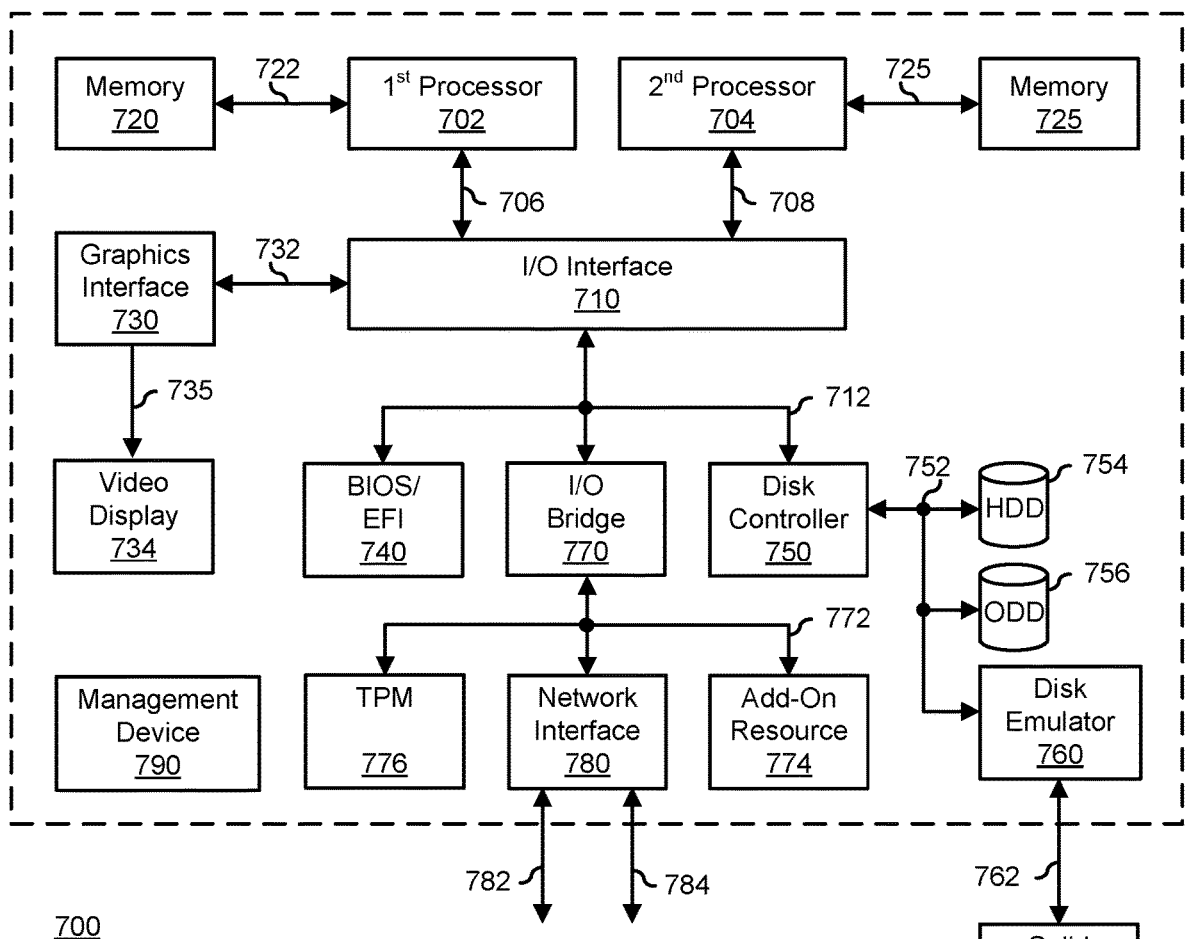
FIG. 7 is a block diagram illustrating a generalized information handling system according to another embodiment of the present disclosure.

FIG. 7 illustrates a generalized embodiment of an information handling system 700. For purpose of this disclosure an information handling system can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 700 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 700 can include processing resources for executing machine-executable code, such as a central processing unit (CPU), a programmable logic array (PLA), an embedded device such as a System-on-a-Chip (SoC), or other control logic hardware. Information handling system 700 can also include one or more computer-readable medium for storing machine-executable code, such as software or data. Additional components of information handling system 700 can include one or more storage devices that can store machine-executable code, one or more communications ports for communicating with external devices, and various input and output (I/O) devices, such as a keyboard, a mouse, and a video display. Information handling system 700 can also include one or more buses operable to transmit information between the various hardware components.

Information handling system 700 can include devices or modules that embody one or more of the devices or modules described below, and operates to perform one or more of the methods described below. Information handling system 700 includes a processors 702 and 704, an input/output (I/O) interface 710, memories 720 and 725, a graphics interface 730, a basic input and output system/universal extensible firmware interface (BIOS/UEFI) module 740, a disk controller 750, a hard disk drive (HDD) 754, an optical disk drive (ODD) 756, a disk emulator 760 connected to an external solid state drive (SSD) 762, an I/O bridge 770, one or more add-on resources 774, a trusted platform module (TPM) 776, a network interface 780, a management device 790, and a power supply 795. Processors 702 and 704, I/O interface 710, memory 720, graphics interface 730, BIOS/UEFI module 740, disk controller 750, HDD 754, ODD 756, disk emulator 760, SSD 762, I/O bridge 770, add-on resources 774, TPM 776, and network interface 780 operate together to provide a host environment of information handling system 700 that operates to provide the data processing functionality of the information handling system. The host environment operates to execute machine-executable code, including platform BIOS/UEFI code, device firmware, operating system code, applications, programs, and the like, to perform the data processing tasks associated with information handling system 700.

In the host environment, processor 702 is connected to I/O interface 710 via processor interface 706, and processor 704 is connected to the I/O interface via processor interface 708. Memory 720 is connected to processor 702 via a memory interface 722. Memory 725 is connected to processor 704 via a memory interface 727. Graphics interface 730 is connected to I/O interface 710 via a graphics interface 732, and provides a video display output 736 to a video display 734. In a particular embodiment, information handling system 700 includes separate memories that are dedicated to each of processors 702 and 704 via separate memory interfaces. An example of memories 720 and 730 include random access memory (RAM) such as static RAM (SRAM), dynamic RAM (DRAM), non-volatile RAM (NV-RAM), or the like, read only memory (ROM), another type of memory, or a combination thereof.

BIOS/UEFI module 740, disk controller 750, and I/O bridge 770 are connected to I/O interface 710 via an I/O channel 712. An example of I/O channel 712 includes a Peripheral Component Interconnect (PCI) interface, a PCI-Extended (PCI-X) interface, a high-speed PCI-Express (PCIe) interface, another industry standard or proprietary communication interface, or a combination thereof. I/O interface 710 can also include one or more other I/O interfaces, including an Industry Standard Architecture (ISA) interface, a Small Computer Serial Interface (SCSI) interface, an Inter-Integrated Circuit (I²C) interface, a System Packet Interface (SPI), a Universal Serial Bus (USB), another interface, or a combination thereof. BIOS/UEFI module 740 includes BIOS/UEFI code operable to detect resources within information handling system 700, to provide drivers for the resources, initialize the resources, and access the resources. BIOS/UEFI module 740 includes code that operates to detect resources within information handling system 700, to provide drivers for the resources, to initialize the resources, and to access the resources.

Disk controller 750 includes a disk interface 752 that connects the disk controller to HDD 754, to ODD 756, and to disk emulator 760. An example of disk interface 752 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 760 permits SSD 764 to be connected to information handling system 700 via an external interface 762. An example of external interface 762 includes a USB interface, an IEEE 1394 (Firewire) interface, a proprietary interface, or a combination thereof. Alternatively, solid-state drive 764 can be disposed within information handling system 700.

I/O bridge 770 includes a peripheral interface 772 that connects the I/O bridge to add-on resource 774, to TPM 776, and to network interface 780. Peripheral interface 772 can be the same type of interface as I/O channel 712, or can be a different type of interface. As such, I/O bridge 770 extends the capacity of I/O channel 712 when peripheral interface 772 and the I/O channel are of the same type, and the I/O bridge translates information from a format suitable to the I/O channel to a format suitable to the peripheral channel 772 when they are of a different type. Add-on resource 774 can include a data storage system, an additional graphics interface, a network interface card (NIC), a sound/video processing card, another add-on resource, or a combination thereof. Add-on resource 774 can be on a main circuit board, on separate circuit board or add-in card disposed within information handling system 700, a device that is external to the information handling system, or a combination thereof.

Network interface 780 represents a NIC disposed within information handling system 700, on a main circuit board of the information handling system, integrated onto another component such as I/O interface 710, in another suitable location, or a combination thereof. Network interface device 780 includes network channels 782 and 784 that provide interfaces to devices that are external to information handling system 700. In a particular embodiment, network channels 782 and 784 are of a different type than peripheral channel 772 and network interface 780 translates information from a format suitable to the peripheral channel to a format suitable to external devices. An example of network channels 782 and 784 includes InfiniBand channels, Fibre Channel channels, Gigabit Ethernet channels, proprietary channel architectures, or a combination thereof. Network channels 782 and 784 can be connected to external network resources (not illustrated). The network resource can include another information handling system, a data storage system, another network, a grid management system, another suitable resource, or a combination thereof.

Management device 790 represents one or more processing devices, such as a dedicated baseboard management controller (BMC) System-on-a-Chip (SoC) device, one or more associated memory devices, one or more network interface devices, a complex programmable logic device (CPLD), and the like, that operate together to provide the management environment for information handling system 700. In particular, management device 790 is connected to various components of the host environment via various internal communication interfaces, such as a Low Pin Count (LPC) interface, an Inter-Integrated-Circuit (I2C) interface, a PCIe interface, or the like, to provide an out-of-band (OOB) mechanism to retrieve information related to the operation of the host environment, to provide BIOS/UEFI or system firmware updates, to manage non-processing components of information handling system 700, such as system cooling fans and power supplies. Management device 790 can include a network connection to an external management system, and the management device can communicate with the management system to report status information for information handling system 700, to receive BIOS/UEFI or system firmware updates, or to perform other task for managing and controlling the operation of information handling system 700. Management device 790 can operate off of a separate power plane from the components of the host environment so that the management device receives power to manage information handling system 700 when the information handling system is otherwise shut down. An example of management device 790 include a commercially available BMC product or other device that operates in accordance with an Intelligent Platform Management Initiative (IPMI) specification, a Web Services Management (WSMan) interface, a Redfish Application Programming Interface (API), another Distributed Management Task Force (DMTF), or other management standard, and can include an Integrated Dell Remote Access Controller (iDRAC), an Embedded Controller (EC), or the like. Management device 790 may further include associated memory devices, logic devices, security devices, or the like, as needed or desired.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:
1. An information handling system, comprising:
a hardware processor to execute code; and
a memory to store the code;

wherein the processor is configured to execute the code to:
  receive, for each of a plurality of platforms of a portfolio of platforms, a set of validation items to be validated on that particular platform;
  determine that a first set of validation items for a first platform includes a first validation item, wherein the first set of validation items includes a first number of validation items;
  determine that a second set of validation items for a second platform includes a second validation item, wherein the second set of validation items includes a second number of validation items, the second number of validation items being less than the first number of validation items;
  compare the first validation item with the second validation item to determine if the first and second validation items are duplicate validation items; and
  when the first and second validation items are duplicate validation items, modify the first set of validation items to exclude the first validation item, and maintain the second set of validation items to include the second validation item based upon the second number of validation items being less than the first number of validation items.

2. The information handling system of claim 1, wherein in modifying the first set of validation items to exclude the first validation item and maintaining the second set of validation items to include the second validation item, the processor is further configured to:
  determine that a completion of the first validation item is prior to a schedule for the second validation item, wherein modifying the first set of validation items to exclude the first validation item and maintaining the second set of validation items to include the second validation item is in response to determining that the completion is prior to the schedule.

3. The information handling system of claim 1, wherein in modifying the first set of validation items to exclude the first validation item and maintaining the second set of validation items to include the second validation item, the processor is further configured to:
  determine that the first validation item is completed and experienced a negative outcome, wherein modifying the first set of validation items to exclude the first validation item and maintaining the second set of validation items to include the second validation item is in response to determining that the first validation item is completed and experienced the negative outcome.

4. The information handling system of claim 1, further comprising:
  a display configured to show the first set of validation items and the second set of validation items.

5. The information handling system of claim 4, wherein the display is further configured to show that the first validation and the second validation items are duplicate validation items.

6. The information handling system of claim 5, wherein the display is further configured to show that the first set of validation items excludes the first validation item.

7. The information handling system of claim 5, wherein the display is further configured to show that the second set of validation items maintains the second validation item.

8. A method, comprising:
  receiving, by a hardware processor of an information handling system, a set of validation items to be validated on that particular platform for each of a plurality of platforms of a portfolio of platforms;
  determining that a first set of validation items for a first platform includes a first validation item, wherein the first set of validation items includes a first number of validation items;
  determining that a second set of validation items for a second platform includes a second validation item, wherein the second set of validation items includes a second number of validation items, the second number of validation items being less than the first number of validation items;
  comparing the first validation item with the second validation item to determine if the first and second validation items are duplicate validation items; and
  when the first and second validations are duplicate validation items, and based upon the second number of validation items being less than the first number of validation items:
    modifying the first set of validation items to exclude the first validation item; and
    maintaining the second set of validation items to include the second validation item.

9. The method of claim 8, wherein in modifying the first set of validation items to exclude the first validation item and maintaining the second set of validation items to include the second validation item, the method further comprises:
  determining that a completion of the first validation item is prior to a schedule for the second validation item, wherein modifying the first set of validation items to exclude the first validation item and maintaining the second set of validation items to include the second validation item is in response to determining that the completion is prior to the schedule.

10. The method of claim 8, wherein in modifying the first set of validation items to exclude the first validation item and maintaining the second set of validation items to include the second validation item, the method further comprises:
  determining that the first validation item is completed and experienced a negative outcome, wherein modifying the first set of validation items to exclude the first validation item and maintaining the second set of validation items to include the second validation item is in response to determining that the first validation item is completed and experienced the negative outcome.

11. The method of claim 8, further comprising:
  displaying the first set of validation items and the second set of validation items on a display of the information handling system.

12. The method of claim 11, further comprising:
  showing, on the display, that the first validation and the second validation items are duplicate validation items.

13. The method of claim 12, further comprising:
  showing that the first set of validation items excludes the first validation item, and that the second set of validation items maintains the second validation item.

14. A portfolio validation management system, comprising:
  a hardware processor to execute code; and
  a memory to store the code;
  wherein the processor is configured to execute the code to:
    receive, for each of a plurality of information handling systems of a portfolio of information handling systems, a set of validation items to be validated on that particular information handling system;

determine that a first set of validation items for a first information handling system includes a first validation item, wherein the first set of validation items includes a first number of validation items;

determine that a second set of validation items for a second information handling system includes a second validation item, wherein the second set of validation items includes a second number of validation items, the second number of validation items being less than the first number of validation items;

compare the first validation item with the second validation item to determine if the first and second validation items are duplicate validation items; and when the first and second validations are duplicate validation items, modify the first set of validation items to exclude the first validation item, and maintain the second set of validation items to include the second validation item.

15. The information handling system of claim 1, wherein in modifying the first set of validation items to exclude the first validation item and maintaining the second set of validation items to include the second validation item, the processor is further configured to:

determine that a first workload associated with the first validation item is greater than a second workload associated with the second validation item, wherein modifying the first set of validation items to exclude the first validation item and maintaining the second set of validation items to include the second validation item is in response to determining that the first workload is greater than the second workload.

16. The information handling system of claim 1, wherein in modifying the first set of validation items to exclude the first validation item and maintaining the second set of validation items to include the second validation item, the processor is further configured to:

determine that a first schedule for the first validation item is prior to a second schedule for the second validation item, wherein modifying the first set of validation items to exclude the first validation item and maintaining the second set of validation items to include the second validation item is in response to determining that the first schedule is prior to the second schedule.

17. The information handling system of claim 1, wherein in modifying the first set of validation items to exclude the first validation item and maintaining the second set of validation items to include the second validation item, the processor is further configured to:

determine that a first cost for the first validation item is greater than a second cost for the second validation item, wherein modifying the first set of validation items to exclude the first validation item and maintaining the second set of validation items to include the second validation item is in response to determining that the first cost is greater than the second cost.

18. The method of claim 8, wherein in modifying the first set of validation items to exclude the first validation item and maintaining the second set of validation items to include the second validation item, the method further comprises:

determining that a first workload associated with the first validation item is greater than a second workload associated with the second validation item, wherein modifying the first set of validation items to exclude the first validation item and maintaining the second set of validation items to include the second validation item is in response to determining that the first workload is greater than the second workload.

19. The method of claim 8, wherein in modifying the first set of validation items to exclude the first validation item and maintaining the second set of validation items to include the second validation item, the method further comprises:

determining that a first schedule for the first validation item is prior to a second schedule for the second validation item, wherein modifying the first set of validation items to exclude the first validation item and maintaining the second set of validation items to include the second validation item is in response to determining that the first schedule is prior to the second schedule.

20. The method of claim 8, wherein in modifying the first set of validation items to exclude the first validation item and maintaining the second set of validation items to include the second validation item, the method further comprises:

determining that a first cost for the first validation item is greater than a second cost for the second validation item, wherein modifying the first set of validation items to exclude the first validation item and maintaining the second set of validation items to include the second validation item is in response to determining that the first cost is greater than the second cost.

* * * * *